US009940882B2

(12) United States Patent
Zhu et al.

(10) Patent No.: US 9,940,882 B2
(45) Date of Patent: Apr. 10, 2018

(54) SOURCE DRIVER CIRCUIT AND DISPLAY DEVICE

(71) Applicant: SHENZHEN CHINA STAR OPTOELECTRONICS TECHNOLOGY CO., LTD., Shenzhen (CN)

(72) Inventors: Jiang Zhu, Shenzhen (CN); Yu Yeh Chen, Shenzhen (CN); Dongsheng Guo, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/417,160

(22) PCT Filed: Nov. 4, 2014

(86) PCT No.: PCT/CN2014/090277
§ 371 (c)(1),
(2) Date: Jun. 6, 2016

(87) PCT Pub. No.: WO2016/041241
PCT Pub. Date: Mar. 24, 2016

(65) Prior Publication Data

US 2017/0178576 A1 Jun. 22, 2017

(30) Foreign Application Priority Data

Sep. 16, 2014 (CN) .......................... 2014 1 0471908

(51) Int. Cl.
*G09G 5/10* (2006.01)
*G09G 3/36* (2006.01)
(Continued)

(52) U.S. Cl.
CPC ... *G09G 3/3607* (2013.01); *G09G 2310/0291* (2013.01); *G09G 2310/0297* (2013.01); *G09G 2320/0673* (2013.01)

(58) Field of Classification Search
CPC .......... G09G 3/3688; G09G 2310/027; G09G 2310/0291
See application file for complete search history.

(56) References Cited

U.S. PATENT DOCUMENTS

2006/0028426 A1* 2/2006 Hiratsuka ............ G09G 3/3614 345/103
2007/0229439 A1* 10/2007 Wang .................. G09G 3/3685 345/100
(Continued)

FOREIGN PATENT DOCUMENTS

CN 101059946 A 10/2007
CN 101727850 A 6/2010
(Continued)

*Primary Examiner* — Nan-Ying Yang
(74) *Attorney, Agent, or Firm* — Buchanan Ingersoll & Rooney PC

(57) ABSTRACT

In the technical field of display, a source driver circuit and a display device according to the present disclosure, which can effectively reduce the heat generating efficiency of a gamma driver circuit cooperating with the source driver circuit, lower the temperature of the gamma driver circuit, and facilitate the integration of the gamma driver circuit with other driver circuits, are provided. The source driver circuit is in connection with several pixel gray scale reference voltages from the gamma driver circuit, and comprises several operational amplifiers, the number of which equals to that of the pixel gray scale reference voltages outputted from the gamma driver circuit, and the operational amplifiers each are connected with a corresponding pixel gray scale reference voltage.

4 Claims, 3 Drawing Sheets

Figure 1:
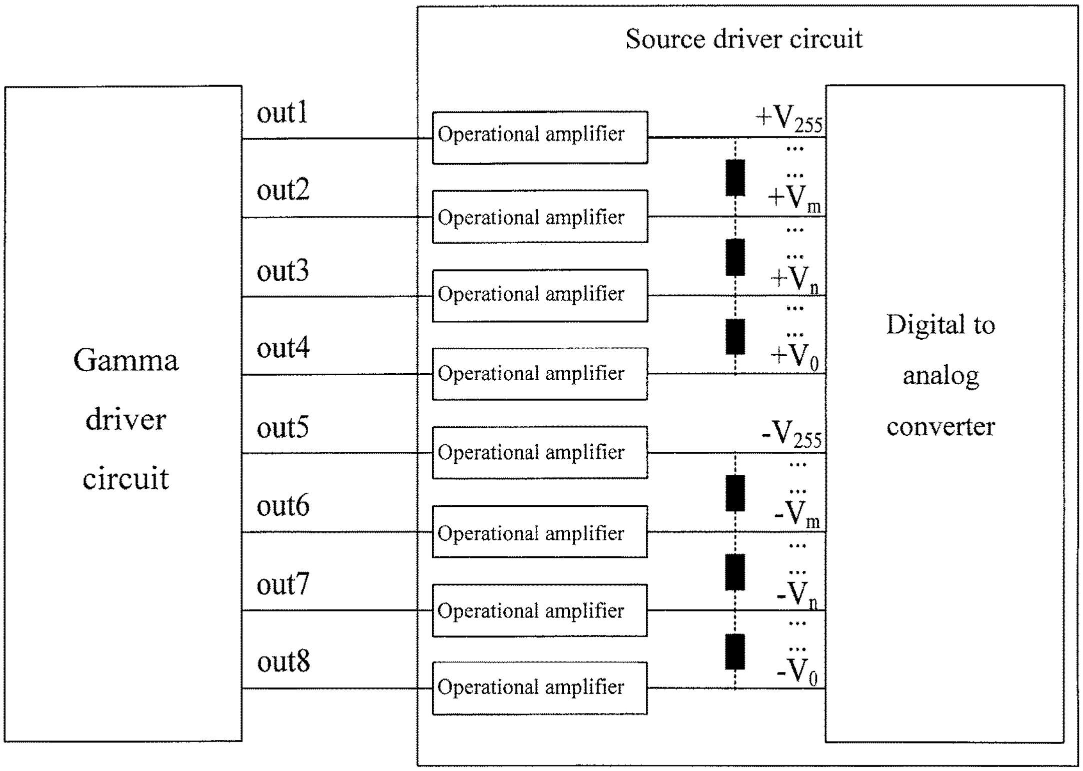

(51) Int. Cl.
*G06F 3/038* (2013.01)
*G09G 5/00* (2006.01)

(56) References Cited

U.S. PATENT DOCUMENTS

| | | | | |
|---|---|---|---|---|
| 2007/0247409 | A1* | 10/2007 | Nishimura | G09G 3/3688 345/89 |
| 2007/0263017 | A1 | 11/2007 | Umeda et al. | |
| 2011/0175942 | A1* | 7/2011 | Ahn | G09G 3/3688 345/690 |
| 2012/0293476 | A1 | 11/2012 | Lee | |
| 2014/0176519 | A1 | 6/2014 | Fu et al. | |

FOREIGN PATENT DOCUMENTS

| | | | |
|---|---|---|---|
| CN | 101800035 | A | 8/2010 |
| CN | 102129847 | A | 7/2011 |
| CN | 103000157 | A | 3/2013 |
| CN | 104240665 | A | 12/2014 |

* cited by examiner

SOURCE DRIVER CIRCUIT AND DISPLAY DEVICE

The present application claims benefit of Chinese patent application CN 201410471908.0, entitled "Source Driver Circuit and Display Device" and filed on Sep. 16, 2014, which is incorporated herein by reference.

TECHNICAL FIELD

The present disclosure relates to the technical field of display, and in particular to a source driver circuit and a display device.

TECHNICAL BACKGROUND

A display panel in a thin film transistor liquid crystal display device comprises a plurality of pixel units, each having at least three sub pixels including a red sub pixel, a green sub pixel and a blue sub pixel. The brightness of each sub pixel is determined by a gamma voltage.

The gamma voltage is provided by a gamma voltage driver circuit based on a gamma curve required by the liquid crystal display device, and acts as a reference voltage for gray scale display of the thin film transistor liquid crystal display device. Gamma voltages each are inputted to a source driver of the thin film transistor liquid crystal display device, and generate all the gray scale voltages through a digital to analog converter in the source driver circuit.

It is found that the existing gamma voltage driver circuit comprises a plurality of digital to analog converters (DACs) and a plurality of operational amplifiers (OPs), with each DAC being connected to a corresponding OP. The DAC converts a digital signal received for generating a pixel gray scale reference voltage into an analog signal, and the OP amplifies and transforms the analog signal processed by the DAC into a pixel gray scale reference voltage, and outputs the pixel gray scale reference voltage to the source driver circuit. Due to large voltage difference between both ends of the OP, both the power consumption and heat generating efficiency of the OP are high, rendering a temperature build-up of the gamma voltage driver circuit. Consequently, the gamma voltage driver circuit is difficult to be integrated with other driver circuits.

SUMMARY OF THE INVENTION

The objective of the present disclosure is to provide a source driver circuit and a display device for effectively reduce the heat generating efficiency and the temperature of a gamma voltage driver circuit cooperating with the source driver circuit, so as to facilitate the integration of the gamma voltage driver circuit and other driver circuits.

In a first aspect according to the present disclosure, a source driver circuit for connection with several pixel gray scale reference voltages from a gamma driver circuit is provided, wherein the source driver circuit comprises several operational amplifiers, the number of which equals to that of the pixel gray scale reference voltages outputted from the gamma driver circuit, and the operational amplifiers each are connected with a corresponding pixel gray scale reference voltage.

The source driver circuit further comprises several first source driver modules, which comprise said several operational amplifiers therein.

The source driver circuit further comprises several second source driver modules.

Each of the first source driver modules comprises a digital to analog converter, and each digital to analog converter comprises several input ends, each input end being connected with an output end of a corresponding operational amplifier.

Each of the second source driver modules comprises a digital to analog converter, and each digital to analog converter comprises several input ends, each input end being connected with an output end of a corresponding operational amplifier.

The source driver circuit comprises four first source driver modules, and each of the first source driver modules comprises two operational amplifiers, and a digital to analog converter having eight input ends, each input end being connected with an output end of a corresponding operational amplifier.

The source driver circuit comprises two first source driver modules and two second source driver modules. Each of the first source driver modules comprises four operational amplifiers, and a digital to analog converter having eight input ends, and each of the second source driver modules comprises a digital to analog converter having eight input ends, with the input ends of each digital to analog converter each being connected to an output end of a corresponding operational amplifier.

The number of operational amplifiers in each of the first source driver modules is the same.

Wires for connecting the source driver circuit and the gamma driver circuit are formed on a printed circuit board.

The present disclosure has the following beneficial effects. In the technical solution according to the present disclosure, a source driver circuit for connection with several pixel gray scale reference voltages from a gamma driver circuit is provided. The source driver circuit comprises several operational amplifiers, the number of which equals to that of the pixel gray scale reference voltages outputted from the gamma driver circuit, and the operational amplifiers each are connected with a corresponding pixel gray scale reference voltage. In this case, it is unnecessary to provide an operational amplifier in the gamma driver circuit cooperating with the source driver circuit, and thus the heat generating efficiency and the temperature of the gamma driver circuit can both be effectively reduced, thereby the integration of the gamma driver circuit with other driver circuits can be facilitated.

In a second aspect according to the present disclosure, a display device comprising said source driver circuit for connection with several pixel gray scale reference voltages from a gamma driver circuit is provided, wherein the source driver circuit comprises several operational amplifiers, the number of which equals to that of the pixel gray scale reference voltages outputted from the gamma driver circuit, and the operational amplifiers each are connected with a corresponding pixel gray scale reference voltage.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE ACCOMPANYING DRAWINGS

Figure 2:
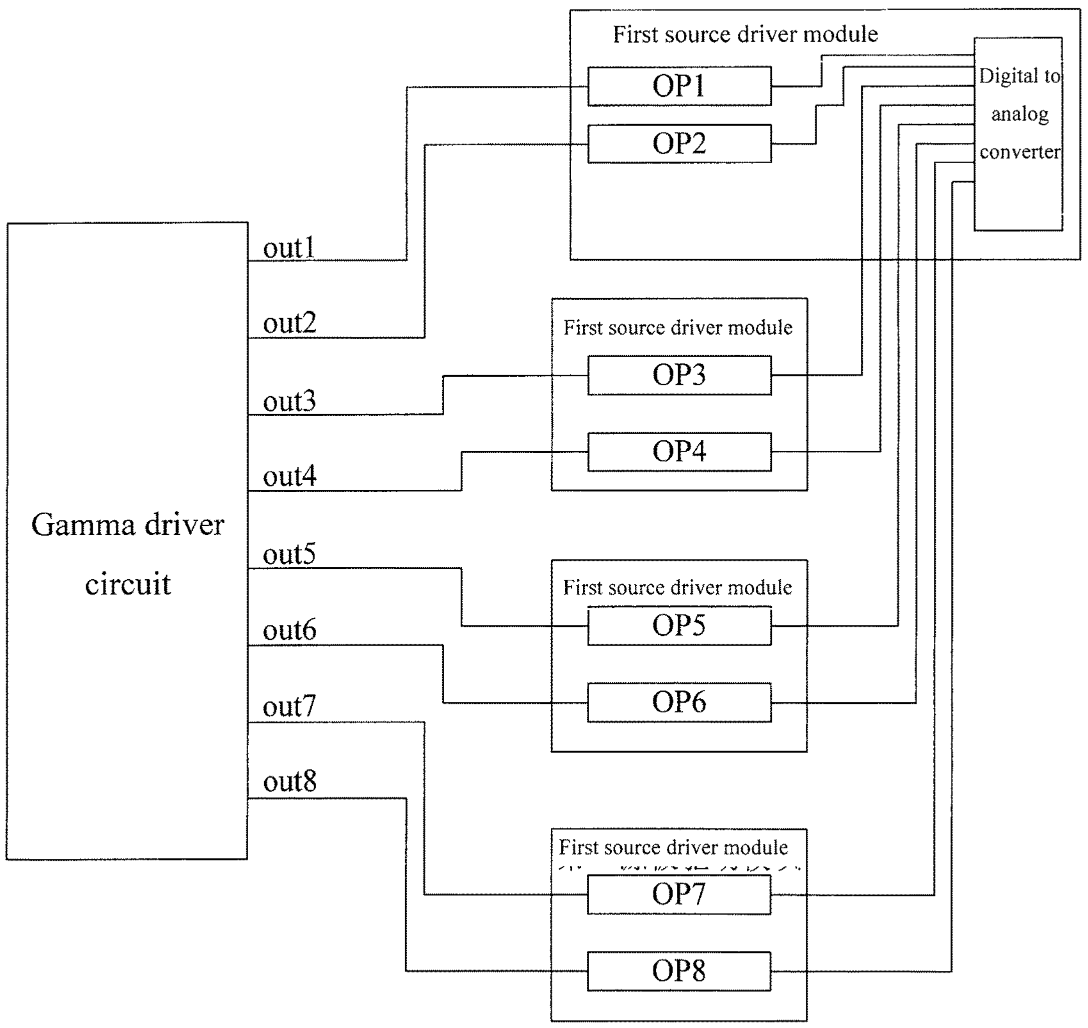
Figure 3:
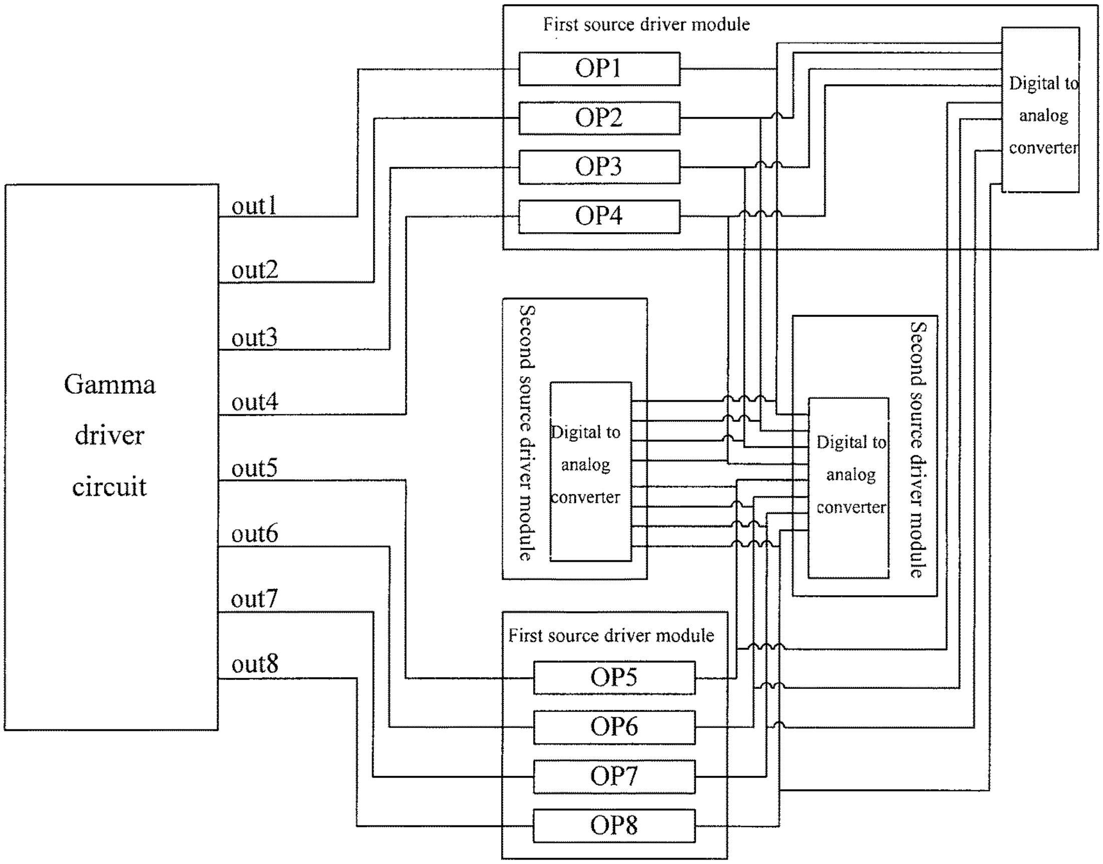

In order to illustrate the technical solutions of the embodiments of the present disclosure, the drawings relating to the embodiments will be explained briefly. In which:

FIG. 1 schematically shows a structure of a source driver circuit according to an example of the present disclosure, FIG. 2 schematically shows a structure of a source driver circuit according to another example of the present disclosure, and FIG. 3 schematically shows a structure of a source driver circuit according to a further example of the present disclosure.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

In an example according to the present disclosure, a source driver circuit for connection with several pixel gray scale reference voltages from a gamma driver circuit is provided. As shown in FIG. 1, the source driver circuit comprises several operational amplifiers, the number of which equals to that of the pixel gray scale reference voltages outputted from the gamma driver circuit, and the operational amplifiers each are connected with a corresponding pixel gray scale reference voltage.

Assume that a display device has a 256 bit memory, the gamma driver circuit of the display device should output 8 pixel gray scale reference voltages. Correspondingly, as shown in FIG. 1, the source driver circuit comprises 8 operational amplifiers, each being connected with a corresponding pixel gray scale reference voltage. Subsequently, the amplified pixel gray scale reference voltages each are connected to a resistor voltage divider through each of the operational amplifiers. The pixel gray scale reference voltages, which constitute a positive polarity direct voltage and a negative polarity direct voltage, are outputted from the voltage output points as corresponding positive polarity pixel gray scale reference voltages and negative polarity pixel gray scale reference voltages through the resistor voltage divider. Digital to analog converters of the source driver circuit further convert the received digital signals into corresponding analog voltages according to the positive polarity pixel gray scale reference voltages or the negative polarity pixel gray scale voltages. The analog voltages can directly drive corresponding pixels on the display device to display corresponding gray scales.

Obviously, in the technical solution according to an example of the present disclosure, a source driver circuit for connection with several pixel gray scale reference voltages from a gamma driver circuit is provided. The source driver circuit comprises several operational amplifiers, the number of which equals to that of the pixel gray scale voltages. The operational amplifiers each are connected with a corresponding pixel gray scale reference voltage. In this case, it is unnecessary to provide an operational amplifier in the gamma driver circuit cooperating with the source driver circuit, and thus the heat generating efficiency and the temperature of the gamma driver circuit can both be effectively reduced, thereby the integration of the gamma driver circuit with other driver circuit can be facilitated.

It should be noted that a plurality of resistors are in series connection between output points $+V_{255}$ and $+V_m$ in FIG. 1. The number of said resistors in series connection is determined by the value of m, which is a natural number (the same applies to voltage output point $-V_m$). For example, if m is 250, there are 5 resistors in series connection between $+V_{255}$ and $+V_m$ for voltage division, and voltage values outputted from 4 additional voltage output points $+V_{254}$, $+V_{253}$, $+V_{252}$ and $+V_{251}$ are obtained. In addition, the resistance of each resistor can be selected based on the values of each pixel gray scale reference voltage required by the display device. Similarly, in FIG. 1, n in voltage output points $+V_n$ or $-V_n$ can be a natural number larger than 0 but smaller than m.

Moreover, during the operation of the liquid crystal display device, liquid crystal molecules would degrade under the action of an electric field of the same direction over a prolonged period of time. Even when voltage is no longer applied on the liquid crystal molecules, it is still possible that the light transmittance of the liquid crystal cannot restore to that before the voltage is applied, causing undesirable phenomenon, such as ghost image or the like, on the liquid crystal display device. Thus, in order to prevent degradation of liquid crystal molecules, the direction of electric field applied on the liquid crystal molecules should be altered regularly. In this case, it is necessary that the source driver circuit provides alternating driving voltages, so that the direction of the electric field applied on the liquid crystal molecules can be altered, thereby the liquid crystal molecules can deflect to opposite directions. Therefore, as shown in FIG. 1, the source driver circuit can provide a positive polarity pixel gray scale reference voltage or a negative polarity pixel gray scale voltage corresponding to each of the gray scales. For example, it can provide not only $+V_m$, but also $-V_m$.

In an embodiment according to the present disclosure, the source driver circuit comprises a plurality of first source driver modules, which comprises said several operational amplifiers therein. For example, as shown in FIG. 2, the gamma driver circuit of the display device can output 8 pixel gray scale reference voltages, and thus there should be 8 operational amplifiers respectively corresponding to the 8 pixel gray scale reference voltages. The source driver circuit comprises 4 first source driver modules, which accommodate the 8 operational amplifiers therein. The 8 operational amplifiers can be evenly distributed in the 4 first source driver modules, i.e., each first source driver module comprises two operational amplifiers. In addition, the first source driver modules each comprise a digital to analog converter having 8 input ends, each input end being connected to an output end of a corresponding operational amplifier.

By arranging the plurality of operational amplifiers respectively in different first source driver modules, the distribution density of operational amplifiers can be reduced, the heat dissipation thereof can be facilitated, and the temperature of each operational amplifier can be lowered.

It should be noted that the number of operational amplifiers in each of the first source driver modules can also be different, and can be determined according to practical situation. The number of operational amplifiers in each of the first source driver modules is not limited to the examples of the present disclosure.

Specifically, as shown in FIG. 2, each operational amplifier is connected to an output end of the gamma driver circuit. For convenience, the operational amplifier connected to an output end out1 of the gamma driver circuit is named as OP1, and the rest of the operational amplifiers are named in the same fashion. In FIG. 2, four groups of operational amplifiers, namely OP1 and OP2, OP3 and OP4, OP5 and OP6, and OP7 and OP8 are respectively disposed in different first source driver modules. Because each first source driver module comprises a digital to analog converter having eight input ends, in order to guarantee that each input end of the digital to analog converter is connected with the output end of a corresponding operational amplifier, the first source driver module comprising OP1 and OP2 should be connected with the outputs respectively of OP3 and OP4, OP5 and OP6, and OP7 and OP8. Similarly, the first source driver module comprising OP3 and OP4 should be connected with the outputs respectively of OP1 and OP2, OP5 and OP6, and OP7 and OP8; the first source driver module comprising OP5 and OP6 should be connected with the outputs respectively of OP1 and OP2, OP3 and OP4, and OP7 and OP8; and the first source driver module comprising OP7 and OP8 should be connected with the outputs respectively of OP1 and OP2, OP3 and OP4, and OP5 and OP6.

It should be noted that in order for FIG. 2 to clearly illustrate the connections between the digital to analog converters and the operational amplifiers in the first source driver modules, only the wirings for the connection of the first source driver module comprising OP1 and OP2 with the other operational amplifiers are shown. The rest are arranged in the same fashion, and thus will not be shown.

In another embodiment according to the present disclosure, the source driver circuit comprises not only a plurality of first source driver modules, but also a plurality of second source driver modules. None of the second source driver modules comprises an operational amplifier. However, the second source driver modules each comprise a digital to analog converter having several input ends, each input end being connected to an output end of a corresponding operational amplifier.

Specifically, as shown in FIG. 3, the source driver circuit comprises 2 first source driver modules and 2 second source driver modules. The first source driver modules each comprise 4 operational amplifiers and a digital to analog converter having 8 input ends. The second source driver modules each comprise a digital to analog converter having 8 input ends. Each input end of each digital to analog converter is connected to an output end of a corresponding operational amplifier. In a similar manner as mentioned above, each of the operational amplifiers is connected to an output end of the gamma driver circuit. For convenience, the operational amplifier connected to an output end out1 of the gamma driver circuit is named as OP1, and the rest of the operational amplifiers are named in the same fashion. OP1, OP2, OP3 and OP4 are disposed in a first source driver module, and the rest, including OP5, OP6, OP7 and OP8, are disposed in another first source driver module. Obviously, as shown in FIG. 3, the first source driver module comprising OP1, OP2, OP3 and OP4 should be connected with the output ends respectively of OP5, OP6, OP7 and OP8, and the first source driver module comprising OP5, OP6, OP7 and OP8 should be connected with the output ends respectively of OP1, OP2, OP3 and OP4. In addition, the second source driver modules each should be connected with the output end of each of the operational amplifiers.

It should be noted that in order for FIG. 3 to clearly illustrate the connections between the digital to analog converters and the operational amplifiers in the first source driver modules, only the wirings for the connection of the first source driver module comprising OP1, OP2, OP3, and OP4 with the other operational amplifiers are shown. The other first source driver module is arranged in the same fashion, and thus will not be shown.

Obviously, FIGS. 2 and 3 only show the specific implementations of the examples according to the present disclosure. The arrangements of the operational amplifiers, and the number of the first source driver modules and that of the second source driver modules should be adjusted according to practical situation, and thus are not limited to those in the examples according to the present disclosure.

It should be noted that the arrangement of a proper number of operational amplifiers in the first source driver modules would not increase the cost thereof, i.e., the cost of the first source driver modules comprising operational amplifiers is close to that of the second source driver modules comprising no operational amplifier. Furthermore, the cost of manufacturing the gamma driver circuit can be reduced by 20% by removing the operational amplifiers therefrom. Therefore, by arranging operational amplifiers in the first source driver modules, the cost of manufacturing the display device can be reduced.

Generally, the source driver circuit is manufactured through chip on film (COF) technology for bonding an IC chip, to which a source driver circuit is integrated, to a flexible circuit board, i.e., the technology of bonding the chip to a flexible substrate circuit using a flexible stand-by circuit as the chip carrier for packaging. COF only supports single layer wiring, and thus the wirings cannot intersect with each other, or else short circuit would occur. By contrast, the gamma driver circuit is usually disposed on a printed circuit board (PCB), and connections can be realized through arrangement of wirings in a plurality of layers. Therefore, wirings connecting the gamma driver circuit and the source driver circuit can be formed on the PCB, which is easy to realize.

Further, a display device comprising the above source driver circuit is provided according to an example of the present disclosure. The display device can be liquid crystal display device, electronic paper, and organic light emitting diode display device, or products with displaying functions comprising the above display devices, such as television, digital camera, mobile phone and tablet PC, etc.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

The invention claimed is:

1. A source driver circuit for connection with several pixel gray scale reference voltages from a gamma driver circuit, wherein the source driver circuit comprises several operational amplifiers, the number of which equals to that of the pixel gray scale reference voltages outputted from the gamma driver circuit, and the operational amplifiers each are connected with a corresponding pixel gray scale reference voltage, wherein the source driver circuit further comprises two first source driver modules, which comprise said several operational amplifiers therein, wherein each of the first source driver modules comprises four operational amplifiers, and a digital to analog converter having eight input ends, wherein the source driver circuit further comprises two second source driver modules, and wherein each of the second source driver modules comprises a digital to analog converter having eight input ends, with the input ends of each digital to analog converter each being connected to an output end of a corresponding operational amplifier.

2. The source driver circuit according to claim 1, wherein each the input end of the digital to analog converter in the first source driver modules is connected with an output end of a corresponding operational amplifier.

3. The source driver circuit according to claim 1, wherein wires for connecting the source driver circuit and the gamma driver circuit are formed on a printed circuit board.

4. A display device, comprising a source driver circuit for connection with several pixel gray scale reference voltages from a gamma driver circuit, wherein the source driver circuit comprises several operational amplifiers, the number of which equals to that of the pixel gray scale reference voltages outputted from the gamma driver circuit, and the operational amplifiers each are connected with a corresponding pixel gray scale reference voltage, wherein the source driver circuit further comprises two first source driver modules, which comprise said several operational amplifiers therein, wherein each of the first source driver modules comprises four operational amplifiers, and a digital to analog converter having eight input ends, wherein the source driver circuit further comprises two second source driver modules, and wherein each of the second source driver modules comprises a digital to analog converter having eight input ends, with the input ends of each digital to analog converter each being connected to an output end of a corresponding operational amplifier.

* * * * *